United States Patent [19]

Oppermann et al.

[11] Patent Number: 4,901,591
[45] Date of Patent: Feb. 20, 1990

[54] DEVICE FOR BALANCING FORCES, IN PARTICULAR WEIGHT, ACTING ON A ROBOT ARM OR THE LIKE

[76] Inventors: René Oppermann, 144ter, rue Voltaire, F 45120 Chalette-sur-Loing, France; Christian Salesse, 30, rue Jules Auffret, F 93330 Neuilly sur Marne, France

[21] Appl. No.: 315,145

[22] Filed: Feb. 24, 1989

[30] Foreign Application Priority Data

Feb. 26, 1988 [FR] France ................. 88 02423

[51] Int. Cl.$^4$ ............... B66C 23/72; B25J 18/00
[52] U.S. Cl. .......................... 74/469; 16/1 C; 248/292.1; 267/152; 901/48
[58] Field of Search ............ 74/469; 16/1 C; 248/292.1; 901/48; 267/153

[56] References Cited

U.S. PATENT DOCUMENTS 4,620,829 11/1986 Herve ..................... 901/48 X
4,756,204 7/1988 Wittwer et al. ......... 248/292.1 X

FOREIGN PATENT DOCUMENTS 380818 7/1986 Austria .
0165129 12/1985 European Pat. Off. .
2565153 12/1985 France .
1202863 1/1986 U.S.S.R. ..................... 901/48

OTHER PUBLICATIONS

IBM Technical Disclosure Bulletin, vol. 24, No. 9, Feb. 1982, pp. 4497-4499.

*Primary Examiner*—Allan D. Herrmann
*Attorney, Agent, or Firm*—Dennison, Meserole, Pollack & Scheiner

[57] ABSTRACT

A device for balancing the forces acting on a robot arm (10) hinged to rotate about an axis (A), said device comprising an even number of auxiliary parts ($24_1$, $24_2$) hinged about respective mutually parallel axes ($B_1$, $B_2$) which are also parallel to the axis (A) of the arm, with each of said parts supporting two transverse arms (28,30) whose ends are suitable for bearing against a rectilinear portion (48) of a moving member (50) subjected to a return force towards an initial position, the auxiliary parts ($24_1$, $24_2$) being driven at angular speeds which are equal in absolute value but which are in opposite directions in pairs, said speeds also being equal to one half of the angular speed of the robot arm.

9 Claims, 2 Drawing Sheets

DEVICE FOR BALANCING FORCES, IN PARTICULAR WEIGHT, ACTING ON A ROBOT ARM OR THE LIKE

The invention relates to a device for balancing forces, in particular weight, acting on a robot arm or the like, said arm being hinged to rotate about an axis, and in particular about a horizontal axis.

BACKGROUND OF THE INVENTION

Balancing devices of this nature are already known for the purpose of compensating the couples exerted by gravity forces on a robot arm which is hinged to rotate about a horizontal axis. In this way, the energy of the arm drive members is used solely for driving the arm.

Prior art balancing devices suffer from a major drawback of being approximate and of being incapable of exactly compensating couples due to the force of gravity, particularly since these couples vary as a function of the angular position of the robot arm relative to the vertical.

A device for balancing gravity forces and serving to mitigate this drawback is described in French patent No. 84 08383, published under the No. 2 565 153 to which U.S. Pat. No. 4,620,829 corresponds.

The balancing device of the above-mentioned patent comprises a rigid auxiliary part hinged about a second axis parallel to the axis of the robot arm, said part comprising two transverse arms extending on either side of the second axis and having ends which are symmetrically disposed about said axis, said ends being suitable for bearing against a rectilinear portion of a member which moves in translation and which is subjected to a return force towards an initial position, said return force being proportional to the distance between said initial position and the position occupied by the moving member, together with means for rotating said auxiliary part about the second axis at an angular speed whose absolute value is equal to one half of the angular speed of the robot arm.

In this prior balancing device, the assembly is set up angularly in such a manner that when the robot arm is vertical, the two ends of the transverse arms bear simultaneously against said rectilinear part which is then occupying its initial position so that the moving member is not subjected to any return force, with the constant of proportionality between the return force and the amplitude of the displacement of the moving member, and with the distance between the second axis and the ends of the transverse arms both being chosen in such a manner as to ensure balance.

Although this prior device balances the arm properly regardless of its angular position, it nevertheless suffers from certain drawbacks.

Firstly, the device requires accurate guidance to ensure that the moving member moves in translation.

Further, outside the above-mentioned initial position, the bearing force exerted by the auxiliary part on the rectilinear portion of the moving member is offset relative to the translation axis of the moving member for all positions thereof. This means that the device runs the risk of jamming, particularly since the moving member is subjected to a return force which is high. Further, an increase in the forces to be balanced may give rise to an increase in the length of the transverse arms of the auxiliary part, which has the consequence of further increasing the offset effect and thus increasing the risk of jamming for the member which moves in translation. As a result, the very structure of the prior balancing device limits the maximum value of couple the device can balance.

In addition, in order to exert the return force, this prior device requires members such as compression springs which increase in size with increasing return force to be exerted.

It should also be mentioned that this prior device is particularly bulky and difficult to house in an installation including a robot arm, where available volume is often limited.

Finally, the prior balancing device requires the robot arm to be modified in order to be adapted thereto.

Consequently, one of the objects of the invention is to provide a balancing device of the type described in the above-mentioned French patent, but enabling the drawbacks of the prior art to be avoided.

A particular object of the invention is to provide such a balancing device which does not require accurate guidance means for the member which moves in translation and which does not run the risk of jamming.

Another object of the invention is to provide such a balancing device of reduced bulk which is also easily adapted to a robot arm without it being necessary to modify or transform the robot arm.

Yet another object of the invention is to provide such a balancing device capable of balancing couples of high value while the device remains small in size and while reducing the internal stresses specific to the device as much as possible.

SUMMARY OF THE INVENTION

The present invention provides a device for compensating or balancing forces, in particular weight, acting on a robot arm or the like which is hinged to rotate about an axis, in particular a horizontal axis, said device being of the type defined in the introduction. According to the invention, this device comprises: at least one other rigid auxiliary part so as to form an even number of auxiliary parts hinged about respective parallel and coplanar axes, with each auxiliary part supporting two transverse arms; synchronizing means suitable for rotating said auxiliary parts at angular speeds which are equal in absolute value but which are in opposite directions in pairs; at least one of the auxiliary parts being coupled to said rotary drive means; and the assembly being set up in such a manner that when the robot arm is in a position in which the resultant couple applied about the hinge axis of the arm by said forces to be balanced is zero, the ends of the transverse arms of all of the auxiliary parts bear simultaneously against the rectilinear portion which is in its initial position. As a result, the moving member is no longer subjected to any return force when in this initial position, and the constant of proportionality between the return force and the amplitude of the displacement of the moving member, and the distance between each of the second axes and the ends of the transverse arms are chosen so that balance is ensured.

Thus, the auxiliary parts exert bearing forces on the rectilinear portion of the moving member giving rise to a resultant lying in the displacement axis of said moving member, and this happens regardless of the length of the transverse arms of said auxiliary parts.

There is then no need to guide the moving member accurately in translation. Furthermore, in some cases it is even possible to do without any guidance at all.

In a preferred embodiment of the invention, the device comprises two auxiliary parts respectively hinged about the two parallel axes.

In this preferred embodiment, the synchronizing means for the auxiliary parts comprise a set of same-diameter gear wheels fixed to respective ones of the axes of the auxiliary parts and co-operating directly with one another, such that each auxiliary part is rotated in the opposite direction to the direction of rotation of the, or each, immediately-adjacent auxiliary part.

Preferably, one of the synchronizing gear wheels also forms a portion of the drive means. In this case, said synchronizing gear wheel advantageously co-operates with a gear wheel which is fixed to the rotary shaft of the robot arm and which has a diameter which is half the diameter of the synchronizing gear wheel.

Preferably, the rectilinear portion of the moving member is subjected to the action of two return means exerting return forces whose resultant is substantially coaxial to the resultant of the thrust forces at the ends of the transverse arms.

The invention also provides for the device to include a second moving member symmetrical to the first moving member about the plane of the axes of the auxiliary parts, said second moving member being subjected to a return force in the opposite direction to the first-mentioned moving member such that in the initial position occupied by the two moving members, the ends of the transverse arms of all of the auxiliary parts bear simultaneously on both of said moving members.

BRIEF DESCRIPTION OF THE DRAWINGS

An embodiment of the invention is described by way of example with reference to the accodmpanying drawings, in which.

MORE DETAILED DESCRIPTION

Figure 1:
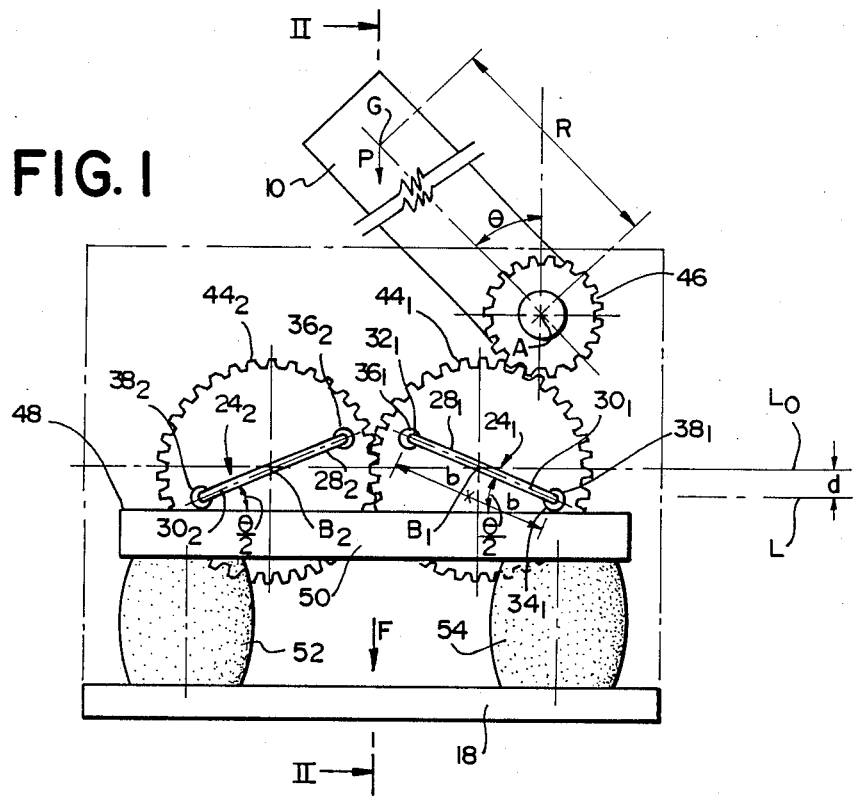
FIG. 1 is an elevation view of an installation including a robot arm and a balancing device in accordance with the invention for said arm.
Figure 2:
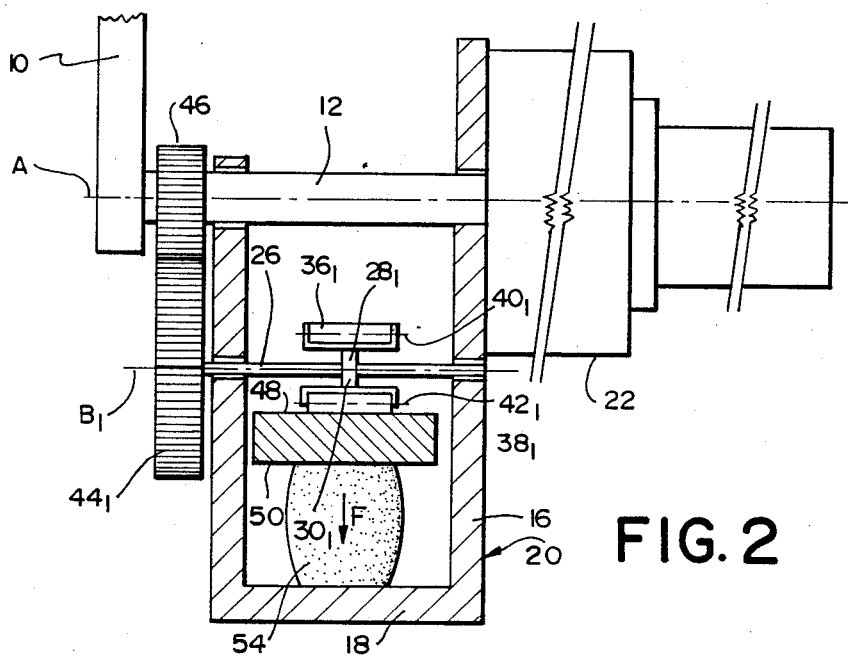
FIG. 2 is a section view on line II—II of FIG. 1 also showing the members for rotating the robot arm.

The installation shown in FIGS. 1 and 2 comprises a robot arm 10 hinged to rotate about a horizontal axis A by means of a shaft 12 on which the arm 10 is fixed. The shaft 12 passes through two parallel vertical plates connected to a horizontal bottom 18, thus forming a frame 20. The arm 10 is suitable for being rotated about its axis A by means of a motor and stepdown gear unit 22 fixed on plate 16. As it rotates, the arm 10 may take up any angular position, thereby forming an arbitrary angle $\theta$ between the vertical going up from A and the main direction of the arm (FIG. 1). Gravity forces P act on the center of gravity G of the arm 10.

In order to compensate the gravity forces acting on the arm, the installation includes a balancing device. The balancing device essentially comprises two rigid auxiliary parts $24_1$ and $24_2$ hinged about two respective horizontal axes $B_1$ and $B_2$ which are parallel to each other and also parallel to the axis A. The axis $B_1$ is embodied by a shaft 26 (FIG. 2) which also passes through the plates 14 and 16. This shaft carries two transverse arms $28_1$ and $30_1$ which extend on either side of the axis $B_1$ and which have symmetrical ends $32_1$ and $34_1$. Both of the transverse arms $28_1$ and $30_1$ are of the same length, i.e. their length is equal to b. The ends $32_1$ and $34_1$ serve as supports for respective rolls $36_1$ and $38_1$ mounted to rotate freely about horizontal axes $40_1$ and $42_1$ parallel to the axis $B_1$. One of the ends of the shafts 26 embodying the axis $B_1$ is constrained to rotate with a gear wheel $44_1$ which meshes directly with a same-diameter gear wheel $44_2$ fixed on the shaft about the axis $B_2$ in the other auxiliary part $24_2$. The part $24_2$ is completely identical to the part $24_1$ and likewise comprises two arms $28_2$ and $30_2$ each of length b, and each likewise carrying end rolls $36_2$ and $38_2$. The gear wheels $44_1$ and $44_2$ constitute synchronizing means suitable for driving the auxiliary parts $24_1$ and $24_2$ at angular speeds which are equal in absolute value but opposite in direction.

Further, the synchronizing gear wheel $44_1$ meshes directly with the gear wheel 46 fixed to the drive shaft 12 of the arm 10.

The ends of the transverse arms of the two auxiliary parts are suitable for bearing against a rectilinear portion 48 of a moving member 50 which is moveable in translation and which is subjected to a return force towards an initial position $L_0$ (FIG. 1) which is proportional to the distance d between said initial position and the position L currently occupied by said moving member.

In the example, this return force is provided by two return means, e.g., springs 52 and 54 working in compression. In the example, these two members are blocks of resilient foam, e.g. polyurethane foam, having constant stiffness.

The above assembly is set up in such a way that when the robot arm is vertical ($\theta = 0$), the ends of the respective transverse arms of the auxiliary parts $24_1$ and $24_2$ bear simultaneously against the rectilinear portion 48 which is in its initial position $L_0$. In this initial position, the arms $28_1$ and $30_1$ of the part $24_1$, and the arms $28_2$ and $30_2$ of the part $24_2$ are horizontal and all four rolls bear against the top surface of the rectilinear portion 48.

By virtue of the gear wheels 46, $44_1$, and $44_2$, the parts $24_1$ and $24_2$ rotate at angular speeds which are equal in absolute value to one half of the angular speed of the arm 10.

If the arm 10 is rotated from the above-mentioned initial position to take up an angle $\theta$ relative to the outwardly directed vertical (FIG. 1), the auxiliary parts $24_1$ and $24_2$ take up a position in which the corresponding arms occupy an angle $\theta/2$ relative to the portion 48. In the position shown in FIG. 1, it is end rolls $38_1$ and $38_2$ which bear against the top surface 48 of the moving portion 50. In all positions other than the above-mentioned initial position, the top face 48 of the moving portion always has either the two rolls $38_1$ and $38_2$ or else the two rolls $36_1$ and $36_2$ bearing thereagainst. As a result, the resultant F of the bearing forces lies in the midplane between the axes $B_1$ and $B_2$ and extends perpendicularly to the surface 48.

In the above-mentioned initial position, the moving member 50 is subjected to no return force. If the constant of proportionality between the return force of one of the springs 52 or 58 and the amplitude of displacement of the moving member is designated K, then this constant and the distance b, i.e. the length of each of the transverse arms, should both be selected so as to ensure balancing is achieved.

It can be shown, using the calculations specified in the above-mentioned French patent, that the following relationship should be satisfied for the assembly of the two auxiliary parts in order to achieve this: $\frac{1}{2}Kb^2 = PR$.

Figure 3:
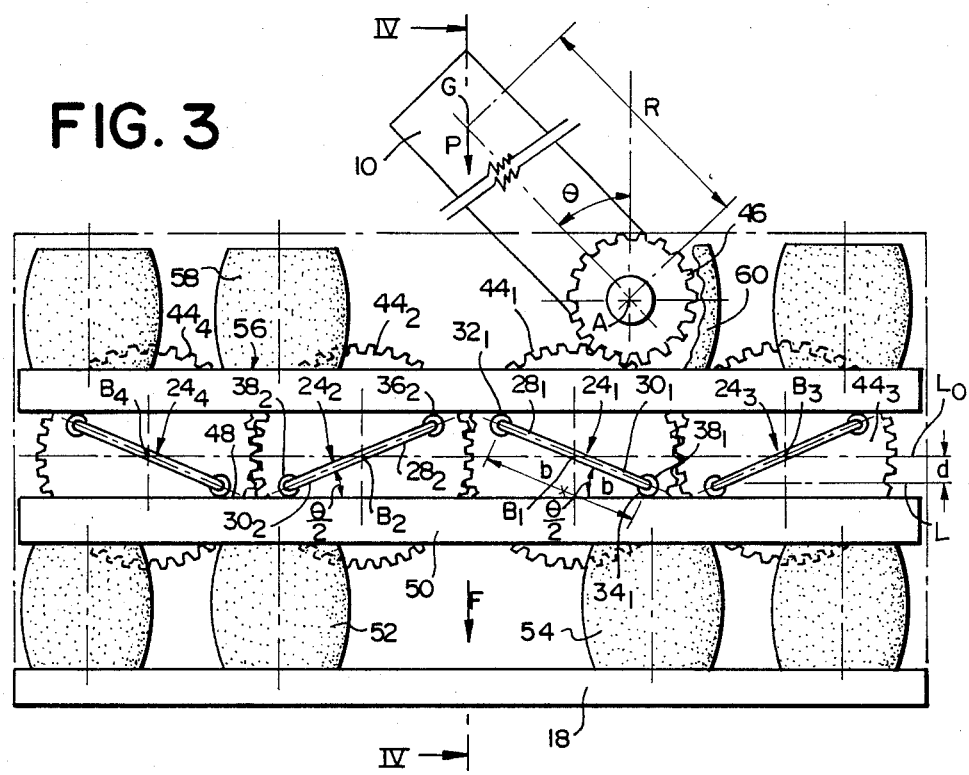
FIG. 3 is an elevation view of another embodiment of an installation including a robot arm and a balancing device in accordance with the invention for said arm.
Figure 4:
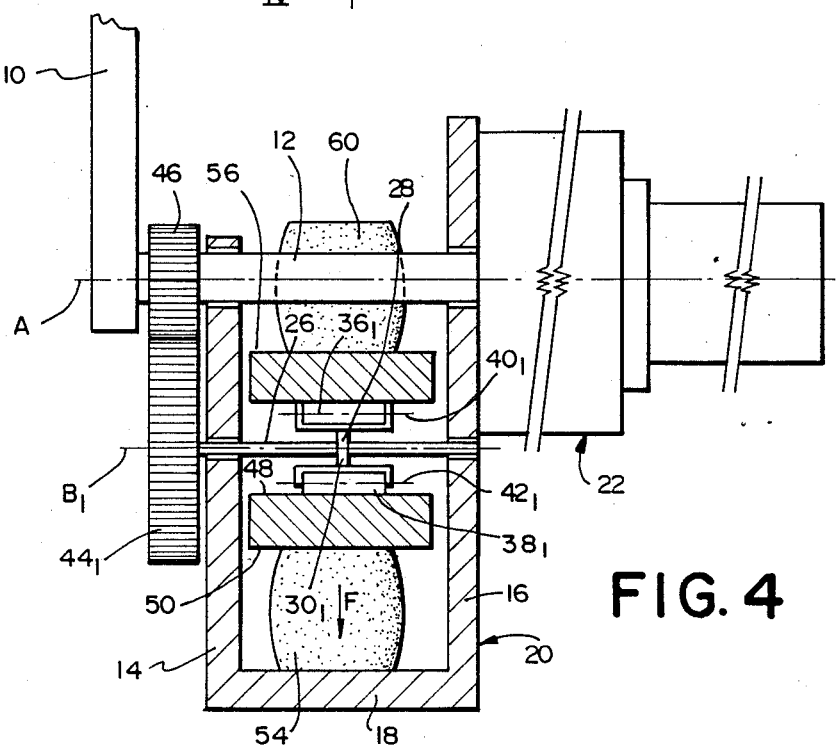
FIG. 4 is a section view on line IV—IV of FIG. 3.

Instead of using two auxiliary parts $24_1$ and $24_2$, it would be possible to use four auxiliary parts by adding two more such parts $24_3$ and $24_4$ as shown in dot-dashed lines in FIGS. 3 and 4. The parts $24_3$ and $24_4$ have respective axes $B_3$ and $B_4$ which are parallel and coplanar with the axes $B_1$ and $B_2$, and they have respective gear wheels $44_3$ and $44_4$ which mesh respectively with the gear wheel $44_1$ and with the gear wheel $44_2$. In this way, all four auxiliary parts rotate at the same angular speed in absolute value but they rotate in opposite directions in pairs. In such a case, it is necessary to use a moving member 50 of appropriate size and it may be necessary to displace the return members 52 and 54. In a variant, not shown, it would be possible to provide a "mattress" of return members distributed between the bottom surface of the member 50 and the bottom plate 18.

A second moving member 56 optionally is provided as shown in FIGS. 3 and 4, disposed symmetrically to the moving member 50 about the plane through the axes of the auxiliary parts. This second moving member should then be subjected to a return force in the direction opposite to the return force applied to the first mentioned moving member, e.g. by means of two, or more, return members 58 and 60. In the initial position occupied by the two moving members, the ends of the transverse arms of the auxiliary parts all bear simultaneously against both moving members 50 and 56. By using two moving members 50 and 56, it is possible both to increase the balance coupled generated by the device and also to reduce the stresses to which the shafts of the auxiliary parts are subjected and the stresses which they apply to the bearings in which they rotate. In this case, the equation to be satisfied is $Kb^2 = PR$.

As can be seen in FIG. 2, the moving member 50 does not need any special guidance since it is subjected to symmetrical forces on one side by the spring members 52 and 54, and on the other side by the transverse arms of the auxiliary parts, and this happens regardless of the length of said transverse arms. It is thus possible to balance a robot arm or the like which is very heavy.

The above-described device is particularly compact and is easily fitted to an existing robot arm without it being necessary to modify or transform the robot arm.

It should be observed that the device of the invention is also capable of operating, albeit less exactly, in conjunction with a robot arm whose axis of rotation is at an angle to the horizontal.

The device is capable of compensating forces of any kind providing they generate variations in couple about the axis of rotation of the movements to be controlled which can be assumed to obey a sinewave function of the angle of said rotary motion, and providing the amplitude of said sinewave is relatively constant.

I claim:

1. A device for balancing forces, in particular weight, acting on a robot arm or the like which is hinged to rotate about an axis, in particular a horizontal axis, said device comprising a rigid auxiliary part hinged about an axis parallel to the axis of the robot arm, said part including two transverse arms extending on either side of its axis and having ends which are symmetrical about said axis, said ends being suitable for bearing against a rectilinear portion of a moving member which is moveable in translation and which is subjected to a return force towards an initial position, said return force being proportional to the distance between said initial position and the position occupied by the moving member, and rotary drive means for rotating the auxiliary part about its own axis at an angular speed which is equal in absolute value to one half of the angular speed of the robot arm, wherein the device comprises: at least one other rigid auxiliary part so as to form an even number of auxiliary parts hinged about respective parallel and coplanar axes, with each auxiliary part supporting two transverse arms; synchronizing means suitable for rotating said auxiliary parts at angular speeds which are equal in absolute value but which are in opposite directions in pairs; at least one of the auxiliary parts being coupled to said rotary drive means; and the assembly being set up in such a manner that when the robot arm is in a position in which the resultant couple applied about the hinge axis of the arm by said forces to be balanced is zero, the ends of the transverse arms of all of the auxiliary parts bear simultaneously against the rectilinear portion which is in its initial position.

2. A device according to claim 1, comprising two auxiliary parts hinged about two respective parallel axes.

3. A device according to claim 1, wherein the synchronizing means for the auxiliary parts comprise a set of same-diameter gear wheels fixed to respective ones of the axes of the auxiliary parts and co-operating directly with one another, such that each auxiliary part is rotated in the opposite direction to the direction of rotation of the, or each, immediately-adjacent auxiliary part.

4. A device according to claim 3, wherein one of the synchronizing gear wheels also forms a part of the drive means.

5. A device according to claim 4, wherein said synchronizing gear wheel co-operates with a gear wheel which is fixed to the axis of rotation of the robot arm and whose diameter is one half of the diameter of the synchronizing gear wheel.

6. A device according to claim 1, wherein the rectilinear portion of the moving member is subjected to the action of two return means exerting return forces whose resultant is substantially coaxial with the resultant of the bearing forces of the ends of the transverse arms.

7. A device according to claim 6, wherein the return means operate in compression.

8. A device according to claim 7, wherein the return means are blocks of resilient foam, e.g. polyurethane foam.

9. A device according to claim 1, including a second moving member symmetrical to the first-mentioned moving member about the plane of the axes of the auxiliary parts, said second moving member being subjected to a return force in the opposite direction to the return force applied to the first-mentioned moving member, such that when both of the moving members are in their initial positions, the ends of the transverse arms of all of the auxiliary parts bear simultaneously against both moving members.

* * * * *